(12) United States Patent
Tralli

(10) Patent No.: US 6,634,651 B2
(45) Date of Patent: Oct. 21, 2003

(54) COMPENSATED TOOL HOLDER FOR TAPPING SPINDLES

(75) Inventor: Domenico Tralli, Cavriago (IT)

(73) Assignee: Meccanica Arnes S.A.S. di Tralli Domenico & C., Cavriago (Reggio Emilia) (IT)

( * ) Notice: Subject to any disclaimer, the term of this patent is extended or adjusted under 35 U.S.C. 154(b) by 0 days.

(21) Appl. No.: 10/005,681

(22) Filed: Nov. 7, 2001

(65) Prior Publication Data

US 2002/0093150 A1 Jul. 18, 2002

(30) Foreign Application Priority Data

Nov. 10, 2000 (IT) ....................... RE20000040 U

(51) Int. Cl.[7] ............... B23B 31/20; B23G 5/14
(52) U.S. Cl. ............... 279/16; 279/42; 408/141; 470/103
(58) Field of Search ............... 279/16, 42, 43.4, 279/48, 157; 408/141; 470/103; 464/167

(56) References Cited

U.S. PATENT DOCUMENTS

| | | | | |
|---|---|---|---|---|
| 1,702,810 A | * | 2/1929 | Buhr ............... | 279/16 |
| 2,370,487 A | * | 2/1945 | Poutie ............... | 279/42 |
| 2,968,979 A | * | 1/1961 | Aijala ............... | 81/474 |
| 3,738,768 A | * | 6/1973 | Kuhn ............... | 279/42 |
| 3,967,830 A | * | 7/1976 | Smith ............... | 279/16 |
| 4,080,090 A | * | 3/1978 | Kern ............... | 408/141 |
| 4,385,534 A | * | 5/1983 | Nichols ............... | 81/114 |

* cited by examiner

Primary Examiner—Steven C. Bishop
(74) Attorney, Agent, or Firm—Abelman, Frayne & Schwab

(57) ABSTRACT

A tool holder for tapping spindles includes a coaxial body (5) composed of an upper hollow half-pin (6) and a lower hollow half-pin (9) which engage mutually and coaxially through a conic semielastic coupling (190) associated with a sequential threaded coupling (11). One (6) of the hollow half-pins includes a continuous conical part (19) capable of sliding in the axial direction, under the action produced by the threaded coupling (11) of the discontinuous conic part (17) of the other hollow half-pin (9). The discontinuous conic part deforms elastically, squeezing on a stem (13) of the tool to be tapped, tying the same.

7 Claims, 2 Drawing Sheets

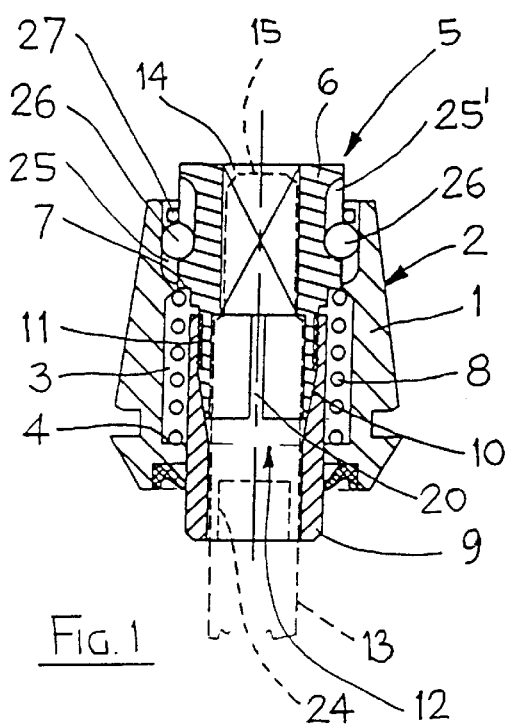
Fig. 1
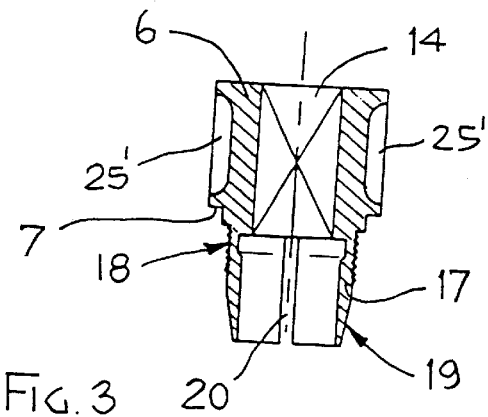
Fig. 3
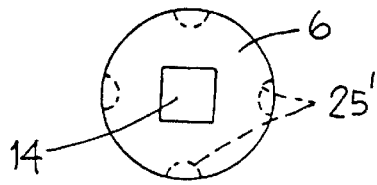
Fig. 4
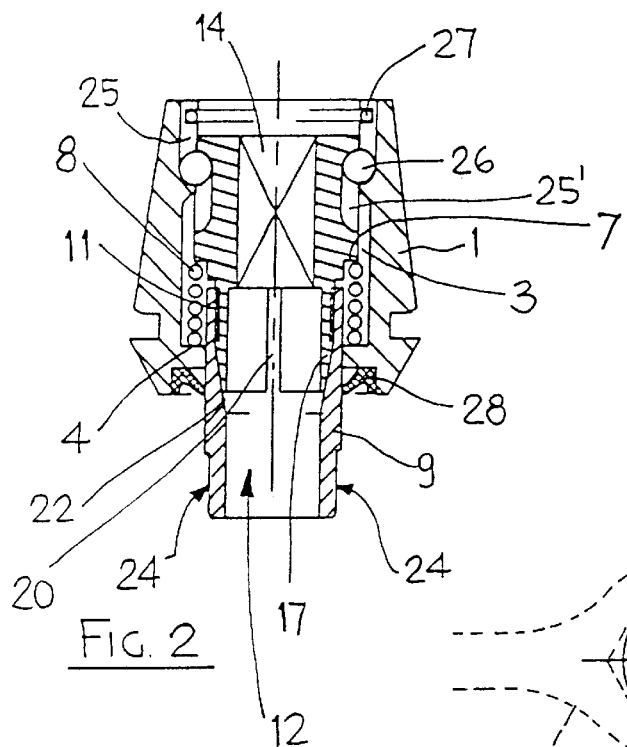
Fig. 2
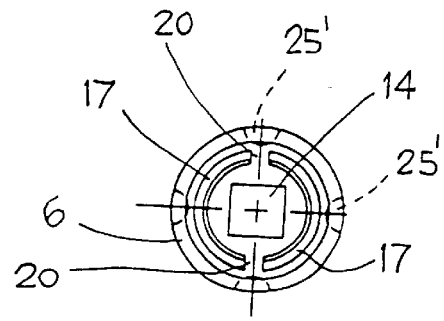
Fig. 5
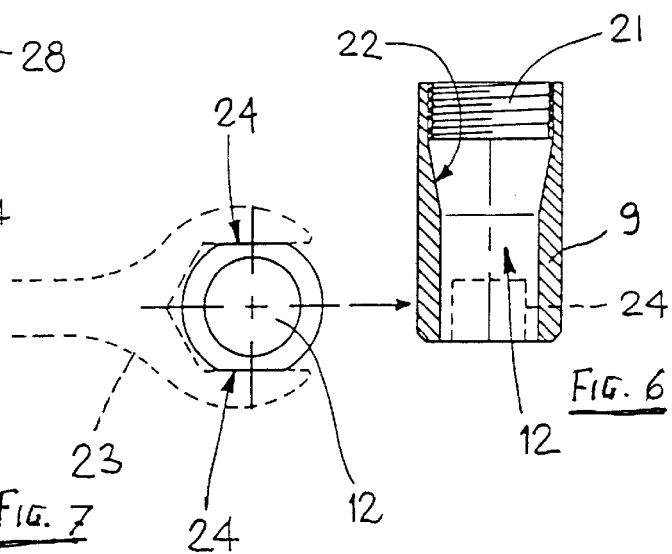
Fig. 6
Fig. 7

COMPENSATED TOOL HOLDER FOR TAPPING SPINDLES

BACKGROUND OF THE INVENTION

1. Field of the Invention

The present invention relates to a compensated tool holder for tapping spindles.

More particularly, the present invention relates to a compensated tool holder for tapping spindles especially suitable for machine tools.

2. Description of the Prior Art

As known, the tapping spindles of the known art includes an external am body and an internal body ("tool holder"), coaxially associated.

The main body has an external conic conformation suitable to be coupled and tied, by a ring nut, to the corresponding conic seat of the standardized attachments or spindles for tool machines, and comprises an internal chamber wherein the internal body ("tool holder"), with the related dampening intermediate spiral spring, is coaxially located.

The rotationally drawing of the internal body is obtained through the coupling of its lower end having a polygonal peripheral profile with a corresponding polygonal hole of the main external body.

The internal body ("tool holder") comprises a cylindrical coaxial through-seat, and it is provided with radial threaded holes arranged in its upper part. In said seat, the tang of the male tools engages and it is fastened, for the rotational drawing, through threaded dowels coupled to said radial threaded holes. The main drawback of the known tapping spindles is the creeping friction of the polygonal coupling between the internal body ("tool holder") and the external body does not allow a regular dampening.

Moreover, the replacement of a screw tap is an operation rather laborious and involve a remarkable loss of time. In fact, it requires: the unscrewing of the fixing ring nut, the disassembly of the spindle from the conic seat of the machine attachment, the loosening of the locking dowels of the male tang to the internal body, the replacement of the screw tap, the locking of the dowels, the re-assembly of the spindle in the attachment, the screwing of the ring nut.

Another drawback of the known tapping spindles is that the spindle does not comprise any protection rings that could allow to prevent the internal dirtying due to greases and/or powders.

SUMMARY OF THE INVENTION

Object of the present invention is to eliminate the above drawbacks.

More particularly, an object of the present invention is to provide a compensated tool holder for tapping spindles of simple and easy construction and use and low cost.

A further object of the present invention is to provide a compensated tool holder for tapping spindles such as to allow the rapid replacement of tapping tools without needing to be dissemble from the operating heads.

Still another object of the present invention is to provide a compensated tool holder for tapping spindles suitable to be used with any type of standardized attachment, with profiles of any unified type.

According to the resent invention, these and still other objects that will become clear thanks to the following description, are achieved by a compensated tool holder for tapping spindles constituted of a central coaxial body with a concentric stem seat comprising an upper hollow half-pin and a lower hollow half-pin that engage mutually and coaxially through a semielastic conic coupling and a sequential threaded coupling, associated with each other.

The conic coupling is constituted of a continuous conic seat located on one of said hollow half-pins, which can slide axially, under the action produced by a threaded coupling, on a complementary conic male part, discontinuous and elastically deformable, that squeezes on the stem of the tools to be tapped, tying the same.

The general structure of the spindle and the configuration of its details are very simple, elementary and of easy construction, just as is simple the manner of use of said spindle.

Besides, the compensated tool holder for tapping spindles of the present invention allows a rapid replacement of the tapping tools, without needing to disassemble them from the operating heads, but acting directly on the direct opening and closing of the tool holder.

BRIEF DESCRIPTION OF THE DRAWINGS

The constructive and functional features of th compensated tool holder for tapping spindles of the present invention will be better understood thanks to the following description, wherein reference is made to the attached drawings which represent some embodiments given only for illustrative and exemplifying but not limiting purpose and wherein:

FIG. 1 shows a cross-sectional schematic view of a complete spindle with the compensated tool holder of the present invention, in the extended phase;

FIG. 2 shows the same schematic view as FIG. 1 of the same spindle in operating conditions;

FIG. 3 shows a cross-sectional schematic view of one of the two hollow half-pins that constitute the compensated tool holder of the preceding Figs.;

FIG. 4 shows a schematic view from the top of the hollow half-pin of FIG. 3;

FIG. 5 shows a schematic view from the bottom of the hollow half-pin of FIG. 3;

FIG. 6 shows a cross-sectional schematic view of a lower end of a half-pin;

FIG. 7 shows schematically how the compensated tool holder of the present invention can be activated;

DESCRIPTION OF THE PREFERRED EMBODIMENT

Figure 9:
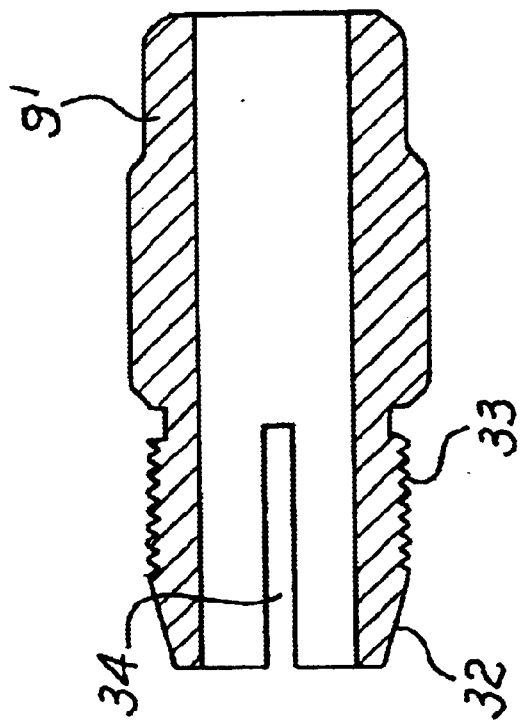
FIG. 9 shows a schematic cross-sectional view of the conic coupling disposed on the upper end of the lower half-pin.

With reference to the Figs., spindle 1 has a conic external configuration 2 shaped as a tool-bearing tool holder, and an external proportioning substantially corresponding to and coupleable with complementary conic seats, with a tying nut ring, of standardized attachments for machines tools having an external profile of any unified type.

Spindle 1 comprises a coaxial central chamber 3, with a lower abutment 4, wherein there is inserted, with the possibility of sliding axially, a coaxial composed body 5. The coaxial body 5 is composed of two parts; an upper hollow half-pin 6 and a lower hollow half-pin 9, that engage mutually and coaxially through a semielastic conic coupling associated to a sequential threaded coupling 11.

The upper hollow body 6 is provided with an abutment 7. Between abutment 4 of chamber 3 and abutment 7 of the upper hollow half-pin 6, an elastic element 8 engages, such as a spiral spring or the like, calibrated for pressure compensation during the operating steps. The central hole 12 of the coaxial composed body 5 forms the housing of the cylindrical stem 13 for a tapping tool, with the upper end part 14 having a quadrangular body, for the rotational drawing coupling of said tool, through the corresponding tang 15.

The lower end 17 of the upper hollow half-pin 6, below abutment 7, comprises a threaded intermediate male portion followed by an end portion with a conic male profile 19. The complete extension of the sequential portions 18–19 comprises longitudinal notches 20. The upper end of the lower hollow half-pin 9 has instead a threaded female portion 21, followed by a conic female portion 22, complementary to the aforesaid male portions 18 and 19.

The screwing of the intermediate threaded male portion 18 of the upper hollow half-pin 6 on the threaded female portion 21 of the lower hollow half-pin 9, causes the complementary coupling of the corresponding conic male portion 19 with the conic female portion 22. By drawing entirely the threaded coupling 11, also the conic semielastic coupling 10 is entirely drawn. In this way the conic female portion 22 of the lower hollow half-pin 9 slides axially on the conic male portion 19 of the upper hollow half-pin 6, which, because of the longitudinal notches 20, is obliged to elastically yield under the pressure produced by such sliding, bending towards the center and squeezing on the cylindrical stem 13 of the tool to be tapped, inserted in the central hole 12.

The pulling of the lower hollow half-pin 9 on the upper hollow half-pin 6 is obtained by means of a conventional wrench 23 which engages in flat notches 24, provided on the external peripheral surface of said half-pin. The opening and closing movement is allowed by the fact that the upper half-pin 6 remains still, retained by the drawing means.

The axially sliding guide and the rotational drawing of the coaxial composed body 5 in spindle 1 are constituted of aligned radial half-grooves 25 and 25' respectively obtained on the internal circumference of the sliding hole of the coaxial composed body 5 in spindle 1 and on the external circumference of the upper half-pin 6, coupled by means of spherical elements 26.

Figure 8:
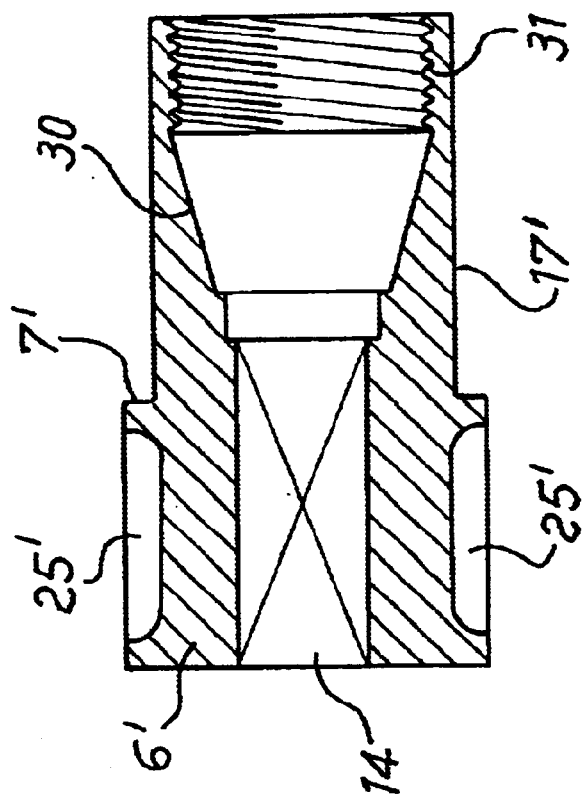
FIG. 8 shows a schematic cross-sectional view of the female portion of the conic coupling disposed on the lower end of the upper hollow half-pin.

Spheres 26 are kept in the seat by means of an upper elastic check ring 27, fixed on the external circumference of the upper half-pin 6. In the lower part of spindle 1, near the lower outlet of the coaxial composed body 5, a circumferential seat for a check-ring 28 for the protection of the internal parts is provided. According to another embodiment, as valid and effective as the above one shown in FIGS. 8 and 9, the semielastic conic coupling 10 and the threaded coupling 11 can be realized in a manner opposite to the one described. Particularly, the lower end 17' of the upper hollow half-pin 6', below abutment 7', comprises a conic intermediate female portion 30 followed by an end portion 31 with a threaded female profile, while the upper end of the lower half-pin 9' is configured as a male conic portion 32, followed by a threaded male portion 33 complementary to the aforesaid female portions. The complete extension of the sequential portions 32, 33 of the half-pin 9' comprises longitudinal notches 34 for elastic deformation.

In substance, the conic semielastic coupling 10 and the threaded coupling 11 are reversed with respect to the first configuration described.

Although the invention has been described in conjunction with specific embodiments, offered for illustrative purpose only, it is evident that many alternatives and variations will be apparent to those skilled in the art in the light of the foregoing description.

Accordingly, the invention is intended to embrace all of the alternatives and variations that fall within the spirit and scope of the appended claims.

What is claimed is:

1. A compensated tool holder for tapping spindles, comprising a spindle (1) and a coaxial hollow body (5) inserted in said spindle (1) and axially sliding therein, said coaxial hollow body (5) comprising an upper hollow half-pin (6) and a lower hollow half-pin (9) that engage mutually and coaxially through a semielastic conic coupling (10), associated with a sequential threaded coupling (11), wherein:

(a) the spindle (1) has an external conic structure (2) configured as a tool holder and an internal coaxial structure provided with a coaxial central chamber (3), having a lower abutment (4), and with radial sliding half-grooves (25);

(b) the upper hollow half-pin (6) of the coaxial body (5) comprises an abutment (7); a lower end (17), below the abutment (7), comprising an intermediate threaded portion (18) followed by an end portion having a conic profile (19), the complete extension of the sequential portions (18, 19) being provided with longitudinal notches (20) of elastic deformations; and an upper end, above the abutment (7), provided, on the external circumference, with radial half-grooves (25'), and having a quadrangular hole (14) for the coupling and rotational pulling of the tool, through the corresponding tang (15);

(c) elastic pressure means (8), with a pressure compensating calibration during operating phases, is engaged between the abutment (4) of the spindle (1) and the abutment (7) of the upper hollow half-pin (6);

(d) guiding and rotational drawing means (26) are arranged between the aligned radial half-grooves (25, 25') of the spindle (1) and of the upper end of the upper hollow half-pin (6); and (e) the lower hollow half-pin (9) comprises an upper end with a threaded portion (21) followed by a conic portion 22, said portions (21, 22) being complementary to the corresponding portions (18, 9) of the lower end (17) of the upper hollow half-pin (6).

2. The compensated tool holder according to claim 1, wherein the lower end (17) of the upper hollow half-pin (6) comprises an intermediate threaded male portion (18) followed by an end portion having a conic male profile (19), and the upper end of the lower hollow half-pin (9) comprises a threaded female portion (21) followed by a female conic portion (22), complementary to the aforesaid male portions.

3. The compensated tool holder according to claim 1, wherein the lower end (17) of the upper hollow half-pin (6) comprises an intermediate conic female portion followed by an end portion having a threaded female profile, and the upper end of the lower hollow half-pin (9) comprises a conic male portion followed by a threaded male portion, complementary to the aforesaid female portions.

4. The compensated tool holder according to claim 1, wherein the external peripheral surface of the lower part of the hollow half-pin (9) is provided with flat notches (24) engaging a wrench (23).

5. The compensated tool holder according to claim 1, wherein the upper end of the spindle (1) is provide with an elastic means (27) of end of travel of the guiding and rotational drawing means (26).

6. The compensated tool holder according to claim 1, wherein the lower part of body of the spindle (1), near the outlet of the coaxial composed hollow body (5), is provided with a circumferential seat for a tying nut ring (28) for the protection of the internal parts.

7. The compensated tool holder according to claim 1, wherein the central hole (12) of the coaxial composed hollow body (5) forms the housing of a cylindrical stem (13) of a tool to be tapped, with its upper end part (14) having a quadrangular cross-sectional hole for the coupling and rotational pulling of said tool through the corresponding tang (15).

\* \* \* \* \*